UNITED STATES PATENT OFFICE.

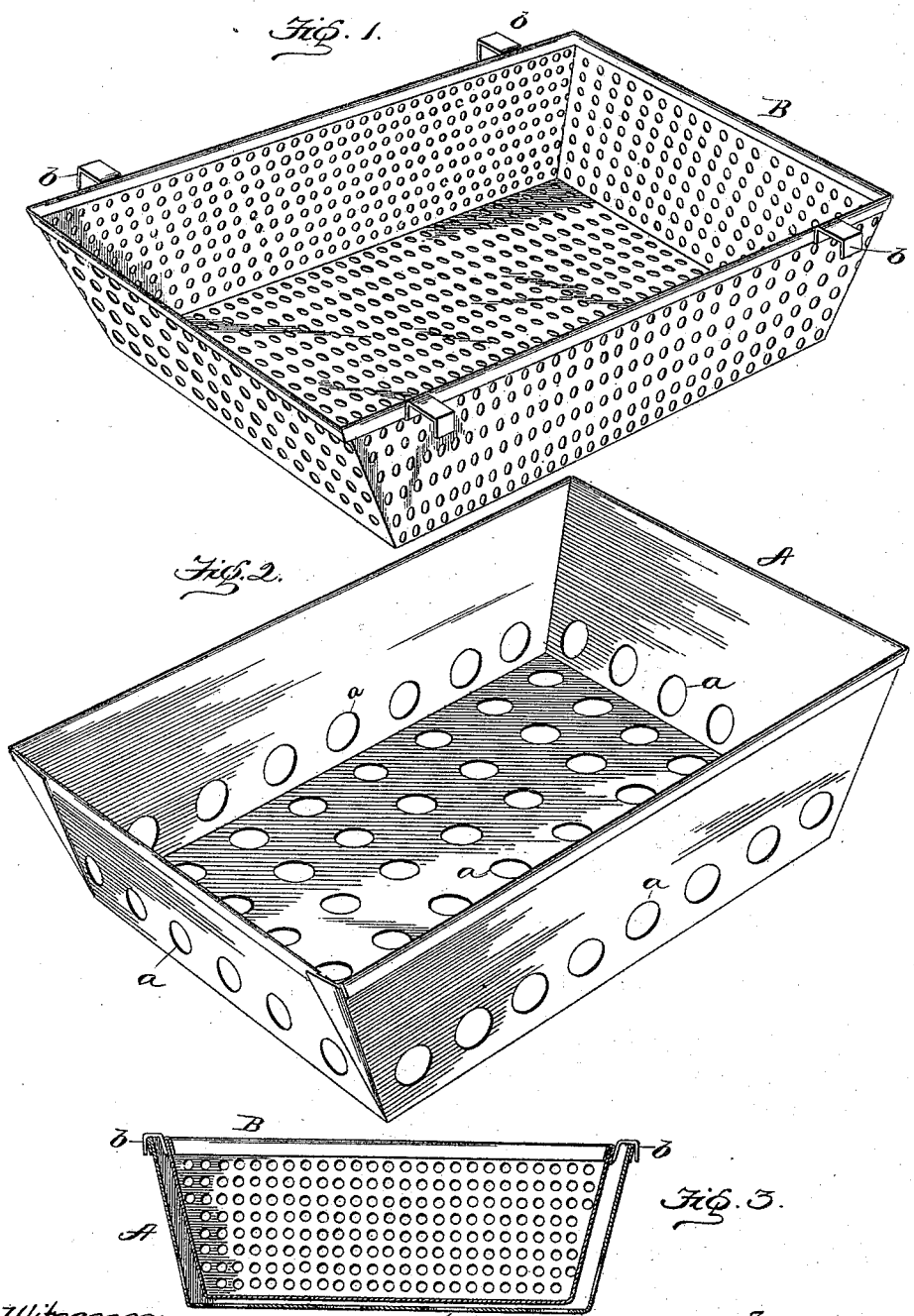

ROBERT C. SNYDER, OF COLFAX, ILLINOIS.

BAKE-PAN.

SPECIFICATION forming part of Letters Patent No. 573,045, dated December 15, 1896.

Application filed April 1, 1896. Serial No. 585,778. (No model.)

*To all whom it may concern:*

Be it known that I, ROBERT C. SNYDER, a citizen of the United States of America, residing at Colfax, in the county of McLean and State of Illinois, have invented certain new and useful Improvements in Bake-Pans; and I do hereby declare the following to be a full, clear, and exact description of the invention, such as will enable others skilled in the art to which it appertains to make and use the same.

My invention relates to sheet-metal pans for baking purposes; and it consists in the combination of devices set forth in the following specification and illustrated in the accompanying drawings, forming a part thereof, in which—

Figure 1 is a perspective view of the inner pan. Fig. 2 is a similar view of the outer pan; and Fig. 3 is a transverse sectional view of the entire device assembled for use, showing the lugs.

Like letters of reference indicate like parts in the several figures.

A is the outer pan, made usually of sheet metal, of any form or size required, either quadrangular, hexagonal, oval, or round. For baking loaves of bread the quadrangular form shown in the illustration is the preferred form, and the size is such as is best adapted for the production of the ordinary household loaf. For baking cake smaller sizes are preferred, and these are usually round or oval. For pies a shallower pan is used, but constructed on the same principles. The pan shown at A is oblong and of the form of an inverted truncated pyramid. The angles or corners may be rounded, if desired. The bread-loaf pan which is most in demand is about fifteen inches long, ten and one-half inches wide, and four and one-half inches deep. This outer pan is provided both on the bottom and the sides with apertures or perforations *a a*. The apertures on the sides and ends are preferably opposite each other, near the bottom, and they are about one-half an inch in diameter in the size of pan illustrated.

B is an inner pan, of the same general shape as the outer pan A, but smaller, so as to set within the latter and leave a free space all around, both on the bottom and on the sides and ends. This inner pan is made of finely-perforated or foraminous sheet metal, usually tin-plate, with metal binding at the top, and is supported on the edges of the outer pan, within which it rests, by suitable means, as lugs *b b*, which hold it in a fixed position within the outer pan at a proper distance from the sides, ends, and bottom thereof and yet permit it to be freely lifted therefrom for cleaning purposes. For ordinary bread-baking, such as the pan shown in the illustration is designed for, the spacing should be about one-fourth of an inch between the bottoms of the two pans and about three-fourths of an inch between the two at the ends and sides, but these proportions may be varied to suit preference or circumstances.

The mode of operation is as follows: The bread, cake, or other article to be baked is prepared in the usual manner and placed in the inner pan, the same being adjusted within the outer pan, and the whole is placed in an oven heated to the requisite temperature. The spacing between the two vessels prevents the direct contact of the highly-heated floor of the oven with the loaf-receptacle, to burn the loaf, while the large apertures in the outer vessel admit the hot air freely and evenly all around the loaf-receptacle, and the spacing forms flues, maintaining a constant circulation of heated air upward and around the material to be baked. Meantime the foraminous material of the inner pan admits the heated air freely and directly to the loaf inside, so that it gets the requisite heat directly by convection of air-currents and not indirectly through the walls of a heated metal substance by conduction, as heretofore, which has a different effect.

The efficiency and superiority of my mode of operation is so great that a saving of from ten to twenty-five minutes of time is effected in an ordinary baking, besides doing much better work, the bread rising from one and one-half to two and one-half inches higher than in the old way.

I claim as my invention and desire to secure by Letters Patent—

1. A utensil for baking purposes, consisting of an outer pan having apertures in the bottom and side walls, and an inner pan also provided with apertures, removably suspended within the outer pan without touching the same, whereby spaces are left between the two pans at the bottom and all around the walls thereof, substantially as and for the purpose specified.

2. The herein-described pan for baking purposes, consisting of an outer pan having openings in the bottom and side walls suitable for the free admission of air, and an inner pan of finely-perforated or foraminous material, removably suspended within the outer pan with an intervening space all around, permitting the free circulation of heated air between the two vessels, substantially as and for the purpose specified.

In testimony whereof I affix my signature in presence of two witnesses.

ROBT. C. SNYDER.

Witnesses:
WALTER W. HARRIS,
JNO. M. KILGORE.